Patented Aug. 29, 1944

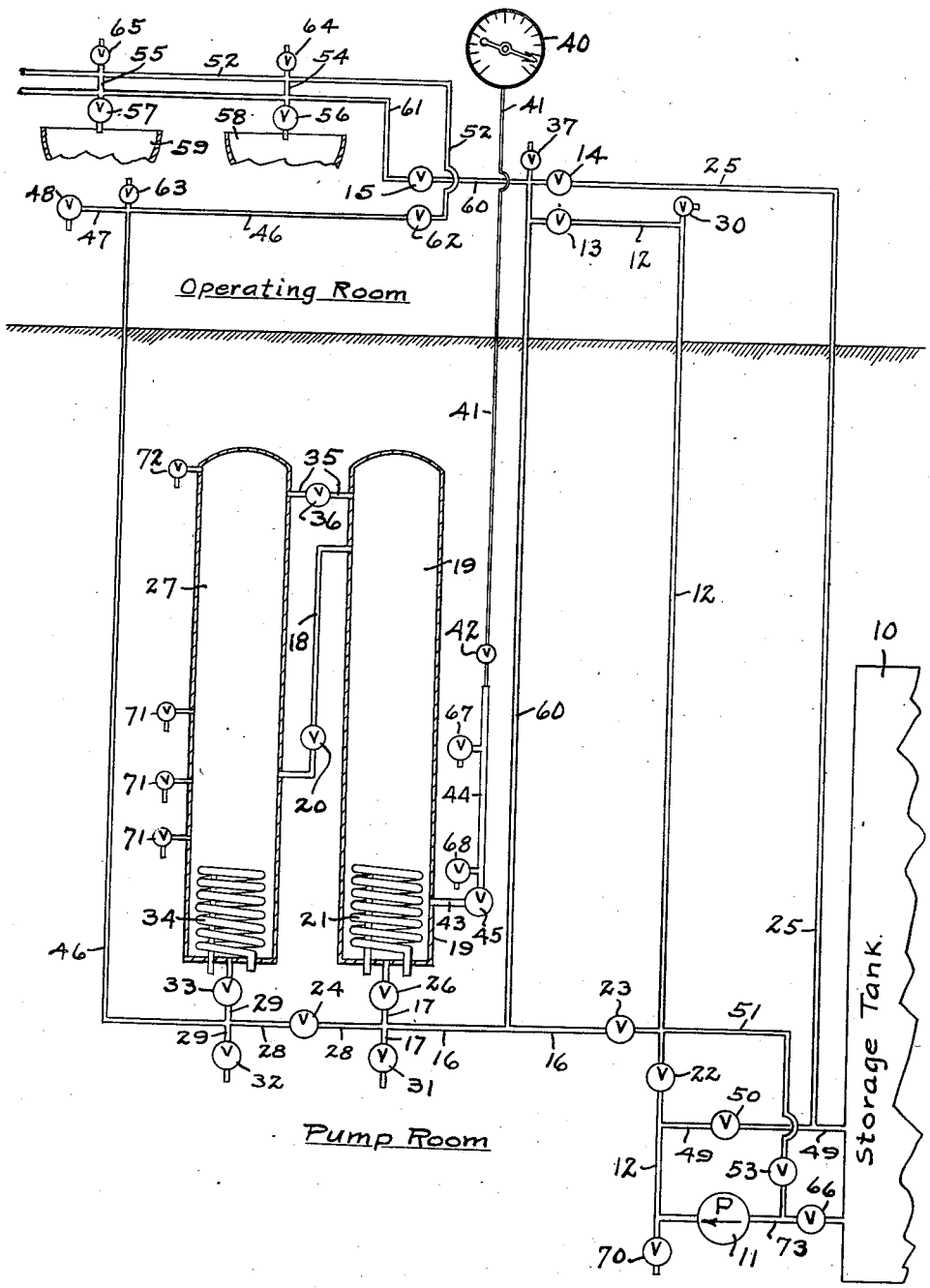

2,357,270

UNITED STATES PATENT OFFICE 2,357,270

MEANS FOR DISPENSING DISCRETE QUANTITIES OF CORN SYRUP

Paul H. Stambaugh, Columbus, Ind., assignor to Union Starch & Refining Co., Columbus, Ind., a corporation of Indiana Application January 29, 1943, Serial No. 473,944

5 Claims. (Cl. 222—61)

This invention relates to handling of corn syrup directly from storage to cooking or mixing vats or tanks by a method which provides for heating if desired and which provides for metering or measuring, within the required degree of accuracy, batches of the corn syrup as may be required for any one particular mix, all without exposure of the corn syrup to the atmosphere during that handling.

A primary object of the invention is to promote a saving of labor and time along with the highest degree of sanitation by eliminating exposure of the corn syrup to the atmosphere such as has heretofore been the case where the syrup has been drawn into measuring or weighing vessels from pipe lines and then carried or dumped into the mixing or cooking vats. Corn syrup is normally quite viscous and when handled in the open, particularly in transferring from one container to another, much syrup will adhere to the vessels and, following the pouring operation, will run down over the outer sides with the result that quite a sticky mess soon results.

By following the present invention, specific quantities of corn syrup may be drawn from a pipe line, the quantity being indicated by pressure gauge readings preferably calibrated to correspond to weights of the corn syrup drawn. In this regard, the accuracy in respect to weights of the quantities so drawn are within a tolerance of approximately one per cent where the gauge reading is within the tolerance of one-fourth of a pound. This tolerance is within the degree of accuracy secured by weighing the syrup on scales in heretofore production practice, and is more accurate for measuring viscous syrup than measuring meters having moving mechanisms. The present invention provides for the measuring out of definite quantities of the corn syrup within the tolerance indicated, all without exposing the corn syrup to the atmosphere unless it be at the point of withdrawal from the pipe line into the mixing or cooking vats, and these vats may be covered to avoid exposure to the air or the pipe may connect to the vats below the level of the materials in the vats.

Furthermore the invention has the advantage of providing for the corn syrup to be preheated after it leaves the storage tank so that the corn syrup added to the mixing or cooking batches is at the optimum maximum temperature which will permit reduction in the cooking time periods in addition to the fact that by so controlling the temperature processing and reducing the time period, there is less deleterious effect on the materials. The batches referred to are such quantities of mixtures of various ingredients entering into the final product being prepared, one product, for example, being candy.

A still further important advantage of the invention is that it provides for reducing the time required for delivering the corn syrup to the batches since the rate of flow of the corn syrup to the batches is not limited by rate of delivery from a pump or elevated tank.

The invention will be best understood by describing one particular system. It is to be understood that the particular layout of the system herein shown and described constitutes but one particular application of the invention, and further it is to be understood that the system may be varied in respect to the location of valve controls and also be varied in respect to the delivery of the corn syrup to the mixing or cooking vessels.

Reference is made to the accompanying drawing, in which the single view is a diagrammatic representation of such a system.

This system comprises a storage tank 10 utilized to receive and store corn syrup delivered to the plant in which the corn syrup is to be subsequently used. A pump 11, preferably of the reciprocating type operated by steam, is employed to take the corn syrup from the storage tank 10 and deliver it to the system. This type of pump is indicated for the reason that steam may be constantly applied to the pump so that the pump may automatically stop (stall) when delivery from the pump is cut off and then when the delivery flow is again permitted, the pump will automatically deliver until the maximum pressure on the corn syrup is again had, this pressure being limited, of course, to the applied steam pressure.

Delivery flow from the pump 11 leads to a pipe 12, from which flow to the system is controlled by three valves, valve 22, valve 23, preferably in the pump room, and the operating valve 13, preferably removed therefrom to be in the operating room. The top level of the pipe 12 has a vent valve 30 to provide a selective opening from the pipe 12 to the atmosphere. The pipe 12 extends downwardly from the pump discharge to a drain valve 70.

From the cut-off valve 23 leads a pipe 16 to interconnect with a vertically disposed pipe 17 This pipe 17 leads upwardly through an intervening cut-off valve 26 to enter the bottom of a pressure tank 19. The pipe 17 leads downwardly from its juncture with the pipe 16 to serve as a drain pipe and in this lower portion is interposed a drain valve 31. The tank 19 may be provided with any suitable means for heating its contents, such means being herein shown as a steam coil 21. Preferably the tank 19 is cylindrical in shape and proportioned to have a relatively small diameter in comparison to the height of the tank. One particular size of tank (which size will vary depending upon the capacity required in any one given location) will have a diameter of eighteen inches and an internal effective height of one hundred inches.

While in some installations a single tank 19 is entirely sufficient to meet the requirements, particularly where the corn syrup is to be delivered always at the same temperature, either that of the corn syrup in the storage tank 10 or at that temperature to which it may be heated in the tank itself, a second tank 27 may be employed, not only to increase the capacity of the delivering and measuring system, but also to provide optional delivery and measuring of heated and unheated corn syrup. When so used, the tank 27 is of the same internal dimensions as well as shape as those of the tank 19. Also both tanks are set to have their floors at the same level. From the vertical pipe 17, between the valves 26 and 31, is carried a pipe 28 horizontally across to a vertically disposed pipe 29 leading downwardly from the floor of the tank 27. A valve 24 is interposed in the pipe line 28 between the two vertical pipes 17 and 29 so as to selectively interrupt flow therebetween.

The pipe 29 extends below the pipe 28 by a length to serve as a drain pipe in which is interposed a drain valve 32 to be selectively opened and closed. That portion of the pipe 29 extending above the pipe 28 likewise is interrupted by a cut-off valve 33. The tank 27 may also be provided with some heating means, herein shown as the steam coil 34. Through means not herein shown, steam may be selectively applied to either one or both of these coils 21 and 34 depending upon whether the corn syrup in those tanks is to be heated to any degree; heated in one tank only; heated alike in both tanks; or heated to a higher temperature in one tank than in the other.

Spaced a distance downwardly from the top level of the tanks, 8 per cent of the effective height of the tanks, is a pipe 35 horizontally disposed to interconnect the tanks 19 and 27, a cut-off valve 36 being interposed in this pipe 35. Also interconnecting the tanks 19 and 27 is a pipe 18 leaving the tank 19 at a distance 16 per cent of the effective height of the tanks from their top level and entering the tank 27 at a distance 32 per cent of the effective height of the tanks from the floor level of the tanks. A cut-off valve 20 is interposed in this pipe 18.

Leading from the pipe 16 between the valve 23 and the juncture of the pipe 16 with the pipe 17, is a pipe line 60 leading up to and connecting with the operating valves 13, 14 and 15. A vent valve 37 at the top level of the pipe line 60 provides a selective opening from the pipe line 60 to the atmosphere. Through the operating valve 13, flow is had from the pipe 12 to the pipe 60. Through the operating valve 14, flow is had from the pipe 60 through a pipe 25 to the storage tank 10. Through the operating valve 15, flow is controlled from the pipe 60 through a pipe 61, pipes 54 and 55, and the valves 56 and 57 in those pipes, to outlets at mixers or cookers 58 and 59.

Leading from the pipe 29 (and its connected pipe 28) between the two valves 32 and 33, is a pipe 46 going from the pump room to the operating room, terminating at an operating valve 62. A vent valve 63 at the top level of the pipe 46 provides a selective opening from the pipe 46 to the atmosphere. From the valve 62 leads a pipe 52 to connect with pipes 54 and 55. At each of the branch pipes 54 and 55 is a vent valve 64 and 65 respectively providing selective openings from the pipe 52 to the atmosphere. To provide an auxiliary discharge from the pipe 46, such as for drawing the syrup into containers, is a branch line 47 in which a valve 48 is interposed.

Corn syrup is quite viscous and gravity flow in an emptying and draining operation would be quite slow and may even stop if the temperature is too low, and therefore, in a complete draining operation, the pump 11 is employed to remove the corn syrup from the system to the storage tank. A suitable piping and valve arrangement is provided to use the pump for pumping from the system and delivering the corn syrup to the storage tank. In the present example, leading from the pipe 12, between the pump 11 and the valve 22, is a pipe line 49 to the storage tank 10, a valve 50 being interposed in the pipe. Also from the pipe 12, between valve 22 and the valve 23 in the branch 16, is a pipe line 51 leading to the suction line 73 of the pump 11. A valve 53 is interposed in this pipe line 51. In the suction line 73 between the storage tank 10 and the connecting line 51 is a valve 66.

A pressure operated gauge 40 is placed in the operating room, and from the gauge leads a one-fourth inch pipe line 41 to a cut-off valve 42 preferably located in the pump room. From the valve 42, the gauge line connects to a vertical two inch pipe 44, at the lower end of which is a cut-off valve 45. A horizontal pipe 43 interconnects the valve 45 and the side of the tank 19 twelve inches above the tank floor.

Spaced apart along the pipe 44 are the try cocks 67 and 68. The gauge line and pipe 44 are constructed to provide for always maintaining light oil in the gauge line 41 between the gauge 40 and the level of the cock 67 and either light oil or corn syrup between the level of the valve 67 and the level of the valve 68 to insure that the level of the corn syrup in the pipe 44 be maintained below the level of the valve 67. The procedure for making the gauge line 41 ready for service comprises closing the valve 45 while the corn syrup is being pumped into the tank 19; breaking the gauge line 41 (such as at a union) below the valve 42; opening the valves 68 and 45 until the corn syrup starts to flow out the valve 68; closing both valves 45 and 68; filling the pipe 44 through the gauge line break with light oil; closing the gauge line break; opening valve 42; opening valve 45; and then venting air from the top of the gauge line 41 adjacent the gauge 40. The valve 67 serves to check the light oil level in that with a light oil level above the valve 67, corn syrup (not oil) discharges at the valve 67. To re-establish the light oil level where it should be in operation at or below the level of the valve 67, the valves 45, 67 and 42 are closed; the gauge line 41 is broken between the valve 42 and the pipe 44; corn syrup is drained through the valve 68 until light oil discharges when the valve 68 is closed; light oil is poured into the gauge line at the break to refill the pipe 44; the gauge line reconnected; the valves 45 and 42 are opened; and then air is vented from the top of the gauge line adjacent to the gauge 40.

With the foregoing example of the system in mind, the several essential steps required to operate the system consist primarily in, first, filling the system with the corn syrup; second, determining the relation between pressures in the tanks 19 and 27 with the weights of corn syrup required to be delivered to the individual mixers or cookers; third, operating procedure for delivering corn syrup at one temperature only to mixers or cookers; fourth, operation procedure for delivering corn syrup at two temperatures to the mixers or cookers; and fifth, draining the system as may be required when the plant is not going to operate for a period of days, perhaps in cold weather, or over week ends.

Starting with the system empty and a supply of corn syrup in the storage tank 10, in the operating room, valves 13, 14, 48, 56 and 57, and also all of the vent valves, are closed. The operating valves 62 and 15 are open.

In the pump room, in which, in the present example, the tanks 19 and 27 are located, the valves 32, 31, 23, 45, 50, 53 and 70 are closed. The tank interconnecting valves 36 and 20 are opened. Also are opened the valves 33, 24, 26, 22 and 66. The valve 23, being initially closed when steam is first applied to the pump 11, is opened slowly and the pump operated until the corn syrup has flowed into the system to the maximum pressure as determined by the steam pressure applied to the pump. Steam, as above indicated, is continued to be applied to the pump to maintain the maximum pressure on the system while venting air from the pipe lines.

Air is vented from the pipe lines 12, 60, 46, and 52 in the operating room by allowing the air to escape through the vent valves 30, 37, 63, 64, and 65 respectively. Immediately all air has escaped through these vent valves, they are closed. The operating valves 62 and 15 are then closed as is also the valve 23 in the pump room. The system is now ready for determining readings on the gauge 40 corresponding to weights of corn syrup that may be drawn through the operating valve 62 and the operating valve 15. The system is also now ready for the regular operation procedure for delivering corn syrup at one temperature only to the mixers or cookers. In bringing the system up to this filled stage, the size of the pump and the sizes of the tank or tanks and the interconnecting piping determines the time required to fill the system, in the present example about thirty minutes.

Proceeding now to the second step of operation of the system, to determine gauge readings in terms of pounds of corn syrup, the operating valve 13 is opened (valve 23 remains closed) until the steam pressures applied at the pump will produce between 100 lbs. per square inch and 90 lbs. per square inch pressure in the tanks 19 and 27, as showing on the gauge 40. The operating valve 13 is then closed. The pump 11 is therefore cut off from the entire delivery system. The operating valve 14 is then manipulated to bleed corn syrup from the tanks 19 and 27 back to the storage tank 10, until the gauge pressure is reduced to exactly a selected pressure (in this present example 85 lbs. per square inch). In this respect it is to be pointed out that since there are no top outlets from the tanks 19 and 27, with the exception of the interconnections 35 and 18, air has been trapped in the top portions of both tanks 19 and 27 when the corn syrup was forced therein through the pipes 17 and 29 from the bottom ends of those tanks. The cross connections 35 and 18 provide means for equalizing of the pressures in the two tanks. The primary reason for selecting the 85 lbs. gauge pressure figure in this present example is to be certain that that pressure will always be available in spite of fluctuations thereabove that may occur in the presence of the steam applied to the pump 11. A pressure other than 85 lbs. may be selected.

Now supposing that a quantity of corn syrup weighing 150 lbs. is required delivered through an outlet valve 56 or 57. Through the valve 48, exactly 150 lbs. of corn syrup is drawn out into a tub or vessel resting on scales. The exact pressure indicated by the gauge 40 is observed and noted following the withdrawal of this quantity of corn syrup. The gauge pressure corresponding to 150 lbs. of corn syrup drawn, in the present example, will then read approximately 56 lbs. For 300 lbs. weight of corn syrup required to be delivered through an outlet, an additional 150 lbs. of the corn syrup is drawn through the valve 48 into a tub or vessel on the scales and the exact gauge pressure is observed and noted, approximately 40 lbs. in the present example. In like manner, to determine the exact gauge pressures corresponding to other weights that may be required delivered, always starting from the selected initial pressure of 85 lbs. (in the present example), those other weights are drawn through the valve 48 and the corresponding gauge pressures observed and noted accordingly.

This second step of determining the interrelationship between pressures and weights of delivered corn syrup having been completed, the dial of the gauge 40 is accordingly calibrated to read directly in pounds weight of corn syrup delivered in place of pounds per square inch of pressure, so that the operator may determine by direct reading from the gauge 40 the weight of corn syrup drawn from the system.

For one temperature corn syrup delivery to the mixers or cookers 58 and 59, the regular operating procedure is as follows. In the operating room the operating valves 13, 14, 15 and 62 are initially closed. The operating valve 13 is opened to apply syrup and pressure, in this present example above 85 lbs., from the pump 11 to the system. The valve 23 remains closed. The operating valve 13 is then closed and the operating valve 14 is manipulated to reduce the metering gauge 40 reading to "zero" (the selected initial 85 lbs. per square inch pressure relation). Either outlet valve 56 or 57 through which delivery of corn syrup is required, is opened wide. Now watching the gauge 40, the operator will manipulate the operating valve 62 and allow the corn syrup to flow until the gauge needle travels to the required weight designation on the gauge dial. The operating valve 62 is then closed and the required weight of corn syrup has been delivered. The delivery outlet valve 56 or 57 that was used, is closed, and no further operation or measurement is required. In the pump room, no manipulation of any valve is required. All batches of syrup withdrawn from the system to the cookers 58 and 59 are obtained by manipulating the control valves on the operating floor.

Now for the next quantity of corn syrup to be delivered, such as at the next adjacent outlet or one down the line, the same procedure is to be followed in each instance, namely, initially the operating valve 62 is closed; operating valve 13 opened until the gauge 40 shows past "zero" (in the present example above 85 lbs.) and then closed; operating valve 14 is opened to bleed out corn syrup to bring the gauge to the initial "zero" position; the cooker valve opened; and then the required weight of corn syrup is drawn through the operating valve 62 which is closed at the required weight reading on the dial of the gauge 40.

To deliver corn syrup at two different temperatures to the mixers or cookers, the operation procedure is as follows. In the operating room, the system is made ready for operation the same as for delivering corn syrup at one temperature as above outlined. In the pump room, the system is made ready for regular operation by having each of all valves positioned (closed or opened) the same as above outlined for delivering one temperature corn syrup, except that the cut-off valve 24 must be closed. The higher temperature corn syrup is delivered from tank 27. Therefore, steam is applied to the heating coil 34 accordingly to provide the required higher temperature corn syrup. The lower temperature corn syrup is delivered from the tank 19. Therefore, steam may or may not be applied to heating coil 21 to provide the required lower temperature corn syrup, depending upon the desired degree of difference in temperatures of corn syrup. The system is now ready for regular operation to deliver to any mixer or cooker, selectively, metered weights of corn syrup as may be required, either the higher temperature or the lower temperature corn syrup or both the higher temperature and the lower temperature corn syrups. In the operating room, operating valve 62 is employed for delivering the higher temperature corn syrup, and the operating valve 15 is employed for delivering the lower temperature corn syrup, both deliveries being made through the common outlet valve 56 or 57 as selected.

The functioning of the method of regular operation for delivering corn syrups at two temperatures is made feasible by the employing of the two tanks 19 and 27 and the arrangement of the piping and valves. In the pump room, in this present example, having the cut-off valve 24 closed is the specific requirement for the system to function for selective delivery of higher temperature corn syrup and lower temperature corn syrup, instead of only one temperature corn syrup.

By reason of the employment of two pressure tanks, the interconnecting assemblies of piping and valves as specifically positioned between the sides of the two tanks, and the other piping with valves specifically positioned, the only operations required by the operator are in the operating room, these operations being the manipulation of one valve for metering and delivering the higher temperature corn syrup, and the manipulation of another valve for the metering and delivering the lower temperature corn syrup.

Now passing to the functioning of the system in regard to the tanks 19 and 27 for the two delivery operation cycles, the cycle for the delivery of the higher temperature corn syrup and the cycle for the delivery of the lower temperature corn syrup, consider the cycles initially starting at the stage of the regular operation at which all operating valves 13, 14, 62 and 15 in the operating room are closed and at which state the metering gauge reading is "zero" (the selected initial 85 lbs. per square inch pressure relation). At this state of regular operation, in the present example, the lower temperature corn syrup top level in tank 19 is either at or little above the level of the connection of pipe 18 to tank 19. Correspondingly, the higher temperature corn syrup top level in tank 27 is either at the same level as or a little lower level than the top level of corn syrup in tank 19.

Now in the first phase of the cycle for delivering to a mixer or cooker a required weight of the higher temperature corn syrup, when the operating valve 62 is manipulated for the metering and delivering to a mixer or cooker, corn syrup is drawn from tank 27, lowering the top level of corn syrup in tank 27 but not lowering the top level of corn syrup in the tank 19. Therefore, only the higher temperature corn syrup from tank 27 is metered and delivered to a mixer or cooker through the operating valve 62. During the second phase of this cycle by the manipulation of operating valve 13 for refilling both tanks 19 and 27 to the amount causing the metering gauge to read past "zero" (at pressure above 85 lbs.), corn syrup enters the tank 19 from the bottom and overflows through the pipe 18 or both through the pipes 18 and 35 to the tank 27 until the corn syrup is at the same level in both tanks 19 and 27, which level is above the level of the connection of the pipe 18 to the tank 19 by reason of the selected dimensions above indicated. The third and last phase of the cycle constitutes the manipulation of the operating valve 14 for bleeding syrup back to the storage tank 10 until the metering gauge reading is "zero."

In the cycle for delivering to a mixer or cooker a required weight of the lower temperature corn syrup, in the first phase in this cycle (the manipulation of the operating valve 15 for the metering and delivering to a mixer or cooker), the corn syrup is forced from the tank 19 causing lowering of the top level of corn syrup in the tank 19, but not lowering of the top level of corn syrup in the tank 27. (Air pressure is equalized through the pipe 35 over the syrup in the two tanks.) Therefore, only the lower temperature corn syrup from the tank 19 is metered and delivered to a mixer or cooker through the operating valve 15 which is closed when this first phase is completed. The second phase (refilling of the tanks 19 and 27) and the third phase (bleeding to the storage tank 10 until the metering gauge reading is "zero") are just the same as the respective phases of the cycle for delivering the higher temperature corn syrup. It is to be noted that the only difference in operation for delivering the higher temperature corn syrup and for delivering the lower temperature corn syrup is that, on the operating floor, the operator employs the operating valve 62 for delivering the higher temperature corn syrup but employs the operating valve 15 for delivering the lower temperature corn syrup.

To empty completely the corn syrup from the system (tanks 19 and 27, also all of the corn syrup pipe lines, not the gauge pipe lines), the operations are as follows. In the operating room where initially all valves are closed, operating valves 13, 14, 62 and 15 are opened. Corn syrup will return through the open valve 14 to the storage tank 10 until there is no pressure on the system indicated at the gauge 40. In the pump room, initially the corn syrup pipe line valves 36, 20, 24, 33, 26, 22, and 66 are open, as are also gauge pipe line valves 45 and 42. Corn syrup pipe line valves 32, 31, 23, 50, 70, and 53 are closed as well as the gauge line try cocks 67 and 68. Then in the drainage operation, the corn syrup pipe line valves 66 and 22 and the gauge line valve 45 are closed. The corn syrup pipe line valves 53, 50, and 23 are opened. The pump 11 operates and then all vent valves are opened in the operating room. The pump 11 is continued in operation until the corn syrup is emptied from the system. When the system is emptied and the pump 11 is stopped, drain valves 31, 32, and 70 are opened and allowed to remain open until the system is to be refilled.

As above indicated, the invention has been described in relation to one particular size of pressure tank without limitation thereto. Different sizes of tanks may be employed to meet different operating conditions particularly in respect to the weights of individual batches of corn syrup required. There is, however, an optimum size of tank or of two combined tanks for accomplishing the metering within permissible weight variation tolerances. The total volume tank capacity for metering and delivering corn syrup at any one location is determined from the volumes (translated into weights) that are required. For any given volume of corn syrup at a given temperature, there will be a definite weight thereof, and while the amount of corn syrup required for any one batch at the cooker is indicated by weight in practice, the volume thereof will be considered in determining the required tank size.

The optimum metering tolerance lies between 1.0% to 1.1% of the volume of corn syrup individually metered, corresponding to ¼ lb. gauge pressure variation. For that optimum tolerance, the total tank capacity volume is determined to be such that the lowest volume of corn syrup delivered will not be less than 10% of that total volume capacity and the maximum volume delivered will not be more than 35% of that capacity. Below that minimum and above that maximum delivery the variation will increase as indicated in the following table:

| Air | | Corn syrup | | Tolerance |
|---|---|---|---|---|
| Gauge pressure, lb. sq. in. | Volume per cent tank vol. | Per cent tank vol. | Delivered per cent tank vol. | Delivered syrup per cent/¼ lb. gauge pressure |
| 85 | 15 | 85 | 0 | 0 |
| 56.4 | 21 | 79 | 6 | 1.25 |
| 45 | 25 | 75 | 10 | 1.1 |
| 35 | 30 | 70 | 15 | 1.1 |
| 27.8 | 35 | 65 | 20 | 1.1 |
| 22.5 | 40 | 60 | 25 | 1.1 |
| 18.3 | 45 | 55 | 30 | 1.1 |
| 15 | 50 | 50 | 35 | 1.1 |
| 12.3 | 55 | 45 | 40 | 1.25 |

The tank size so determined in relation to the batch quantities to be delivered will have a metering tolerance of accuracy, corresponding to ¼ lb. gauge pressure variation, not varying over 1.1% of the delivered volume for metered volumes between the 10% and 35% of tank capacity limits. Below the lower 10% limit, the tolerance increases to 1.25% at 6% volume delivered, and likewise from 35% to 40% the tolerance increases to 1.25%. The optimum size of the total tank volume capacity then is five times the specific volume of corn syrup to be metered. The foregoing metering capacity is what may be termed "normal metering capacity" with the total tank volume contained air initially at atmospheric pressure (zero gauge pressure), and the pressure increasing, for example, upon flowing corn syrup into the tank to 50% of its volume, to 15 lbs. gauge pressure.

The "normal metering capacity" for a maximum volume of delivered corn syrup may be increased by a simple expedient, without adding to the physical tank size, keeping in mind that air pressure times volume equals a constant. The tank 27 may be provided with level indicating try cocks 71 along its vertical wall. Corn syrup is flowed into the tanks 27 and 19 to any one of the selected levels of these cocks 71 with zero gauge air pressure in the tank at that syrup level. Then the side cock 71 at or above the selected level is closed and air is forced into the tanks 27 and 19 through any suitable inlet, such as the valve 72, to 15 lbs. gauge pressure, following which syrup is added to increase the tank pressure as before to above the 85 lbs. gauge amount; the corn syrup bled out to 85 lbs. pressure; and same delivery method followed as before. When the initial corn syrup level leaves an air volume thereabove equal to 62.5% of the total tank volume capacity, the delivered capacity is for metering 1.25 times that of the "normal metering capacity." With the level at 75% air volume, the capacity is increased to 1.50 "normal." It is obvious that the "normal metering capacity" may be had by initially flowing corn syrup into the tanks open to the atmosphere to 50% volume of the tanks; closing the tanks to the atmosphere; and then forcing air into the tanks over the syrup to 15 lbs. gauge pressure.

To use the metering gauge 40, as shown on the accompanying drawing, means using both tanks. Therefore, the valve 24 must be open for establishing the selected corn syrup level so the per cent of the total tank volume capacity containing air will be that above the selected level in both tanks. If only one tank is used; it would be the tank 19, valves 33, 20 and 36 being closed and try cocks would be used on the tank 19.

While the invention has been described in the one particular form as applying to corn syrup, it is obvious that it may apply to other liquids and, further, that structural and operational variations may be employed, including any number of receiving cookers or mixers, location of control valves, number of tanks, and the like, all without departing from the spirit of the invention, and I therefore do not desire to be limited to that precise form beyond the limitations as may be imposed by the following claims.

I claim:

1. In a liquid metering device, a liquid supply tank; a pressure tank; a pump for transferring the liquid to the pressure tank, said pressure tank being formed to have gas entrapped above the level of the liquid as the liquid is forced therein; pipe means for conducting liquid from a lower portion of the pressure tank to a selected point of dispensing of the liquid; valve means between said pump and said pressure tank to be closed during flow of liquid from the pressure tank; and pressure operated means connected with said pressure tank graduated to indicate amounts of liquid withdrawn from the pressure tank; pipe means for conducting liquid from said pressure tank to said supply tank to establish an initial zero reading of said graduated pressure operated means; and valve means in said last pipe means.

2. For dispensing corn syrup, the combination of a supply tank; a compression tank; a pump interconnected between the supply and compression tanks; a second compression tank; indicating means responsive to pressures in either of said compression tanks; a cross-connection between top portions of said compression tanks; outlet pipes leading from the lower end portions of said compression tanks; a pipe interconnecting said outlet pipes and said pump; a shutoff valve in each of said outlet pipes between the respective compression tanks and said pump interconnecting pipe; a shut-off valve in said pump interconnecting pipe between said outlet pipes; and heating means for at least one of said compression tanks.

3. In a liquid metering device, a pair of metering tanks; a pressure equalizing connection between upper portions of the tanks; means connecting an upper portion of one of said tanks with a lower portion of the other tank; a delivery line leading selectively from lower portions of both of said tanks; a delivery control valve in said line; a pressure operated gauge connected to at least one of said tanks; a storage tank; and means for delivering storage tank contents to said delivery line.

4. In a liquid metering device, a pair of metering tanks; a pressure equalizing connection between upper portions of the tanks; means connecting an upper portion of one of said tanks with a lower portion of the other tank; a delivery line leading selectively from lower portions of both of said tanks; a delivery control valve in said line; a pressure operating gauge connected to at least one of said tanks; a storage tank; and means for delivering storage tank contents to said delivery line; said equalizing connection and the upper end of said connecting means both being above the normal maximum level of liquids in said tanks.

5. In a liquid metering device, a pair of metering tanks; a pressure equalizing connection between upper portions of the tanks; means connecting an upper portion of one of said tanks with a lower portion of the other tank; a delivery line leading selectively from lower portions of both of said tanks; a delivery control valve in said line; a pressure operating gauge connected to at least one of said tanks; a storage tank; and means for delivering storage tank contents to said delivery line; said equalizing connection and the upper end of said connecting means both being above the normal maximum level of liquids in said tanks; a second delivery line selectively interconnecting with said tank lower portions; valve means between said two delivery lines selectively limiting flow from one of said tanks to one of said lines, and flow from the other tank to the other line; a control valve in said second line; both of said delivery lines connecting beyond their control valves to a single outlet line; and a valve in said outlet line.

PAUL H. STAMBAUGH.